(12) United States Patent
Hull et al.

(10) Patent No.: US 10,422,365 B2
(45) Date of Patent: Sep. 24, 2019

(54) CLAMP AND A METHOD OF CLAMPING

(71) Applicant: Hifi Engineering Inc., Calgary (CA)

(72) Inventors: John Hull, Calgary (CA); Seyed Ehsan Jalilian, Calgary (CA); Derek Logan, Calgary (CA)

(73) Assignee: Hifi Engineering Inc., Calgary, Alberta (CA)

(*) Notice: Subject to any disclaimer, the term of this patent is extended or adjusted under 35 U.S.C. 154(b) by 0 days.

(21) Appl. No.: 15/739,336

(22) PCT Filed: Jun. 27, 2016

(86) PCT No.: PCT/CA2016/050752
§ 371 (c)(1),
(2) Date: Dec. 22, 2017

(87) PCT Pub. No.: WO2016/205957
PCT Pub. Date: Dec. 29, 2016

(65) Prior Publication Data
US 2018/0209453 A1      Jul. 26, 2018

Related U.S. Application Data

(60) Provisional application No. 62/184,668, filed on Jun. 25, 2015.

(51) Int. Cl.
*F16B 2/24*         (2006.01)
*F16B 2/06*         (2006.01)
(Continued)

(52) U.S. Cl.
CPC ............... *F16B 2/245* (2013.01); *F16B 2/06* (2013.01); *F17D 5/00* (2013.01); *G01B 9/02* (2013.01);
(Continued)

(58) Field of Classification Search
CPC ....................................................... G02B 6/00
(Continued)

(56) References Cited

U.S. PATENT DOCUMENTS 4,037,859 A * 7/1977 Clements ............ F16L 37/1225
24/508
4,162,622 A * 7/1979 Daleo ..................... E05B 75/00
70/16
(Continued)

FOREIGN PATENT DOCUMENTS

| EP | 2172121 B1 | 1/2012 |
|----|------------|--------|
| GB | 894867 A | 4/1962 |
| JP | 2002295728 | 11/2007 |

OTHER PUBLICATIONS

International Search Report and Written Opinion of the International Searching Authority, dated Aug. 18, 2016, for corresponding International Application No. PCT/CA2016/050752, 11 pages.

*Primary Examiner* — Kaveh C Kianni
(74) *Attorney, Agent, or Firm* — Klarquist Sparkman, LLP

(57) ABSTRACT

A clamp for clamping optical fiber to a tube. The clamp has a body portion coupled at one end to a first arm and at an opposing end to a second arm, and a resilient portion to permit the clamp to elastically deform from a closed state in which the clamp is fastened around the tube to an open state in which the clamp is radially moveable off the tube. At least one of the body portion, the first arm and the second arm has a clamping surface to clamp a portion of the optical fiber against the tube when the clamp is fastened around the tube, and a clamping mechanism operable to extend at least part of the clamping surface towards the tube when the clamp is secured to the tube to increase a clamping force applied by the clamping surface.

26 Claims, 11 Drawing Sheets

(51) Int. Cl.
*F17D 5/00* (2006.01)
*G01B 9/02* (2006.01)
*G02B 6/46* (2006.01)
*G01B 11/16* (2006.01)
*G02B 6/00* (2006.01)
*F16L 3/06* (2006.01)
*F17D 5/06* (2006.01)

(52) U.S. Cl.
CPC ............... *G01B 11/18* (2013.01); *G02B 6/46* (2013.01); *F16L 3/06* (2013.01); *F17D 5/06* (2013.01)

(58) Field of Classification Search
USPC .......................................................... 385/136
See application file for complete search history.

(56) References Cited

U.S. PATENT DOCUMENTS

| | | | | |
|---|---|---|---|---|
| 4,934,635 A * | 6/1990 | Sherman | .................... | F16L 3/10 24/279 |
| 5,231,681 A * | 7/1993 | Bergqvist | ................. | G01K 5/46 374/E5.028 |
| 5,797,284 A * | 8/1998 | Lurie | ...................... | E05B 75/00 70/16 |
| 6,109,073 A * | 8/2000 | Parsons | ................... | E05B 19/00 70/16 |
| 6,349,574 B1 * | 2/2002 | Lurie | ...................... | E05B 75/00 70/16 |
| 6,892,594 B2 * | 5/2005 | Buck | ....................... | F16L 3/1008 174/535 |
| 7,620,286 B2 * | 11/2009 | Lu | ......................... | G02B 6/4497 385/134 |
| 2003/0001344 A1 * | 1/2003 | Bono, Jr. | ............... | F16J 15/061 277/631 |
| 2007/0239121 A1 * | 10/2007 | Tully | .................... | A61F 5/4404 604/326 |
| 2007/0278358 A1 * | 12/2007 | Clark | ................... | B60R 16/0215 248/74.1 |
| 2010/0218360 A1 * | 9/2010 | Mangone, Jr. | .......... | B25B 31/00 29/525.01 |
| 2011/0268407 A1 * | 11/2011 | Cowen | ................. | G02B 6/4452 385/135 |
| 2011/0268410 A1 * | 11/2011 | Giraud | ................. | G02B 6/4452 385/135 |
| 2013/0333425 A1 * | 12/2013 | Krelle | .................... | E05B 75/00 70/16 |

* cited by examiner

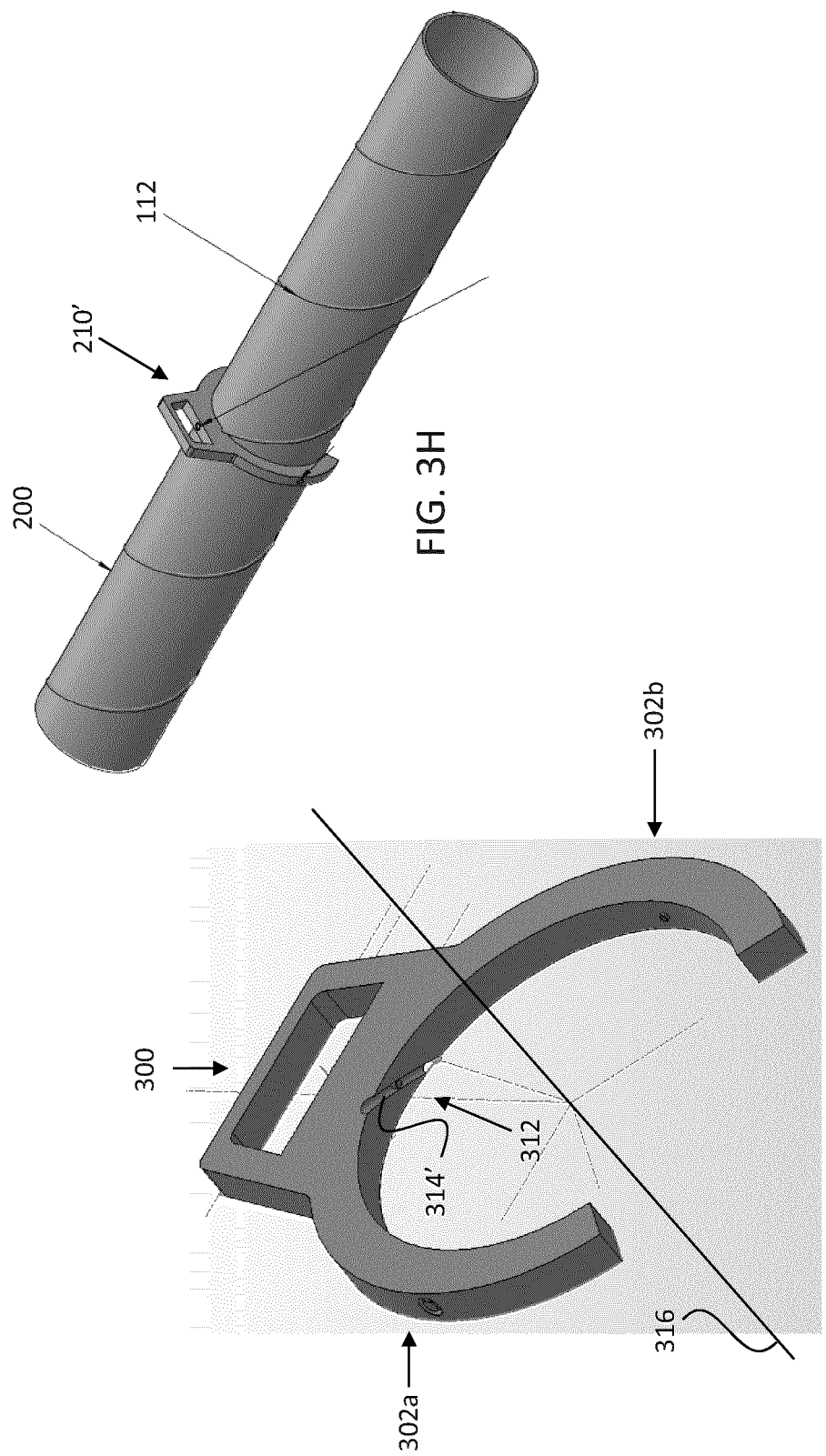

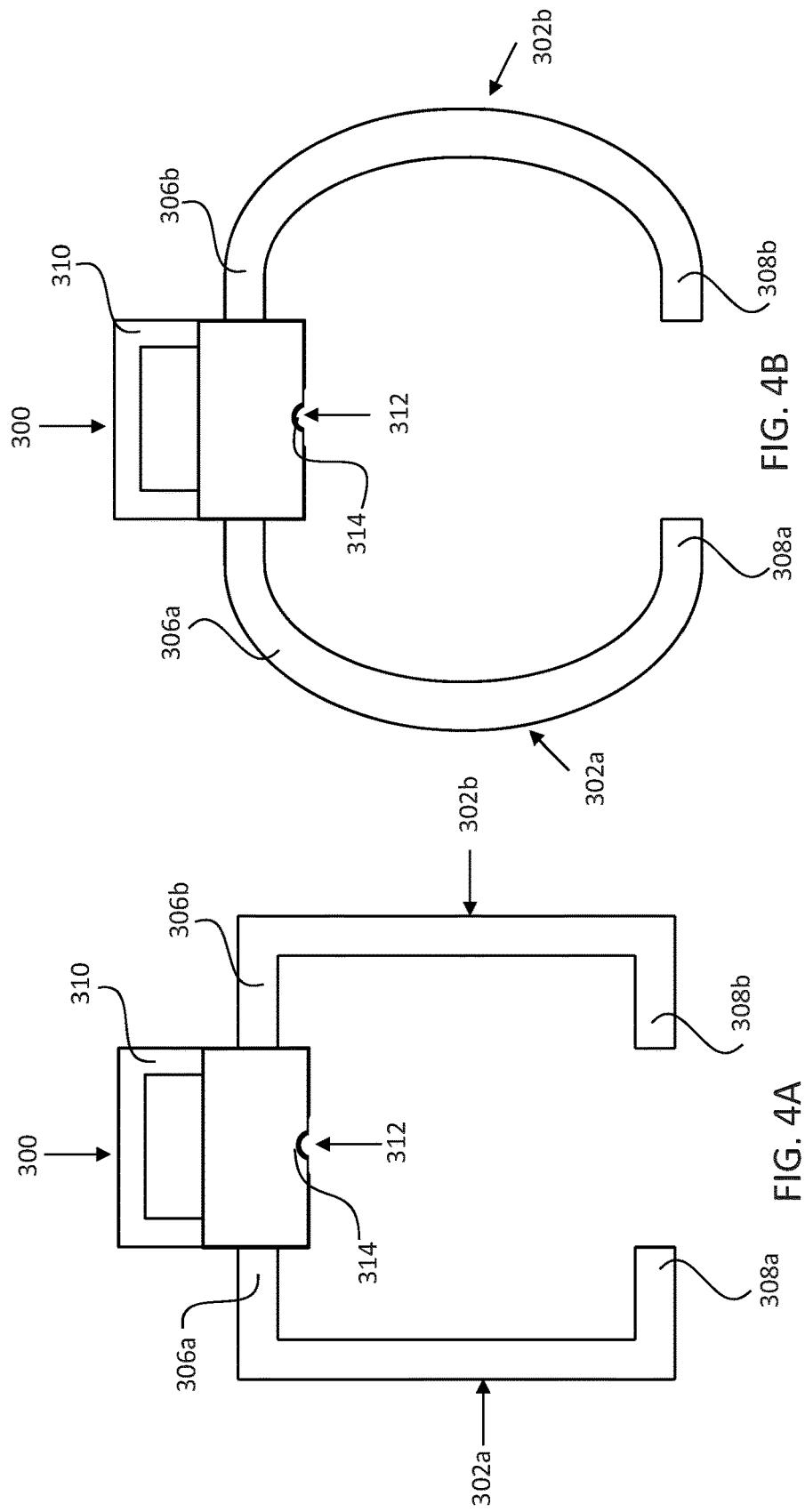

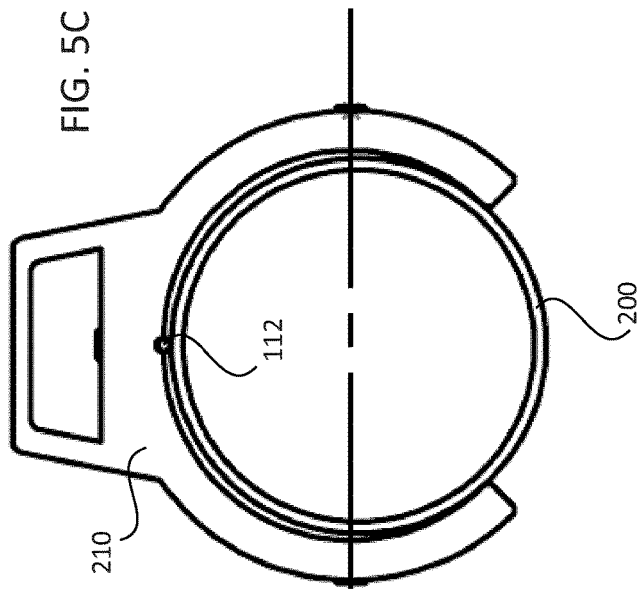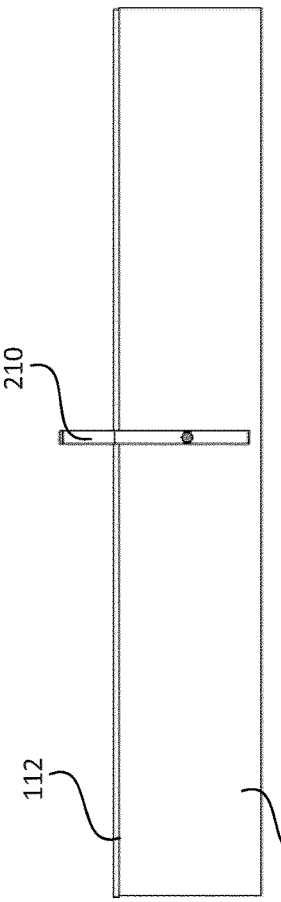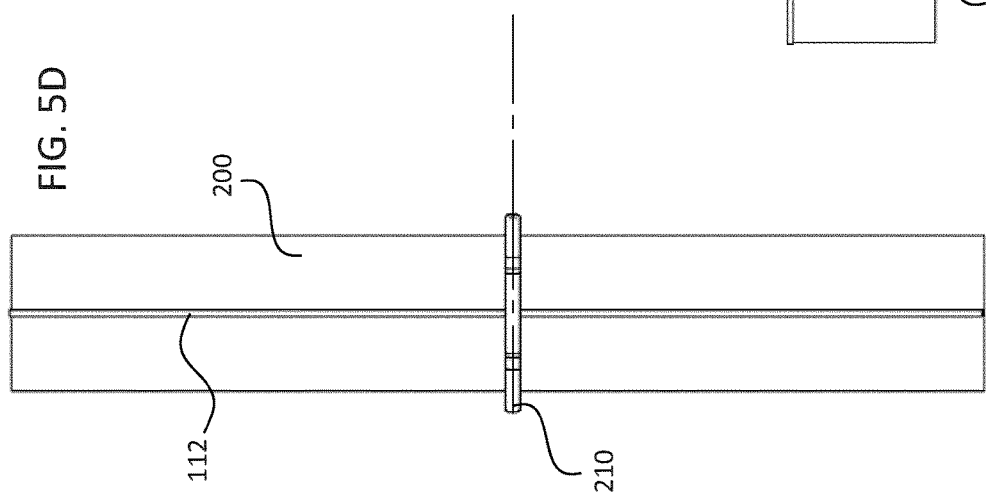

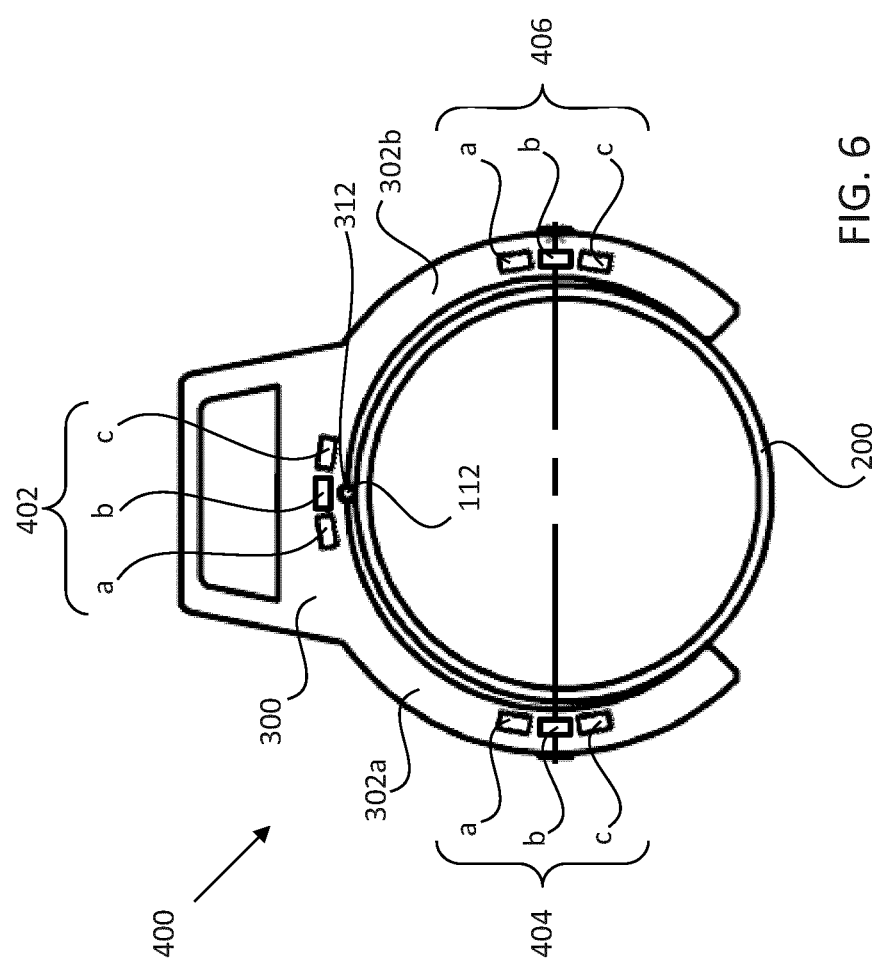

CLAMP AND A METHOD OF CLAMPING

CROSS REFERENCE TO RELATED APPLICATIONS

This is the U.S. National Stage of International Application No. PCT/CA2016/050752, filed Jun. 27, 2016, which in turn claims the benefit of U.S. Provisional Application No. 62/184,668, filed Jun. 25, 2015. The provisional application is incorporated herein in its entirety.

TECHNICAL FIELD

The present disclosure is directed at a clamp and a method of clamping. Specific embodiments relate to clamping an optical fiber to a tube, such as, a pipeline.

BACKGROUND

Optical interferometry is a technique in which two separate light pulses, a sensing pulse and a reference pulse, are generated and interfere with each other. When optical interferometry is used for fiber optic sensing applications, the sensing and reference pulses are at least partially reflected back towards an optical receiver. The nature of the interference observed at the optical receiver provides information on the optical path length the pulses traveled, which in turn provides information on parameters such as the strain the optical fiber experienced.

There exists a desire to use the optical fiber to measure strain forces experienced by a tube. The tube may form part of a pipeline which may in turn form part of an infrastructure for transporting water, waste, or fuel, such as a gas or a liquid. Accordingly, there also exists a desire to secure the optical fiber to a tube.

SUMMARY

A first aspect provides a clamp for clamping optical fiber to a tube, the clamp comprising a body portion coupled at one end to a first arm and at an opposing end to a second arm, the clamp having a resilient portion to permit the clamp to elastically deform from a closed state in which the clamp is fastened around the tube to an open state in which the clamp is radially moveable off the tube, wherein application of a force separating the first and second arms biases the resilient portion and transitions the clamp from the closed state to the open state, and wherein the resilient portion returns the clamp from the open state to the closed state when the force is removed, at least one of the body portion, the first arm and the second arm having a clamping surface to clamp a portion of the optical fiber against the tube when the clamp is fastened around the tube, and a clamping mechanism operable to extend at least part of the clamping surface towards the tube when the clamp is secured to the tube to increase a clamping force applied by the clamping surface.

The clamping surface may comprise a groove for receiving the portion of fiber. The groove may be offset with respect to a longitudinal axis of the clamp.

The clamping mechanism may comprise: a bore formed in the body portion and terminating at the clamping surface, and a fastener extending through the bore and having an end portion forming the at least part of the clamping surface which is operable to extend towards the tube to increase the clamping force. An outer surface of the fastener and an inner surface of the bore may comprise cooperating screw threads such that rotating the fastener in one direction with respect to the bore extends the end portion of the fastener towards the tube to increase the clamping force, and rotating the fastener in the other direction with respect to the bore retracts the end portion of the fastener away from the tube to decrease the clamping force.

The first arm may comprise: a further clamping surface to clamp another portion of optical fiber against the tube when the clamp is fastened around the tube, and a further clamping mechanism operable to extend at least part of the further clamping surface towards the tube to increase a clamping force applied by the further clamping surface. The further clamping surface may comprise a groove for receiving the other portion of optical fiber. The groove may be offset with respect to a longitudinal axis of the clamp. The further clamping mechanism may comprise: a further bore formed in the at least one arm and terminating at the further clamping surface, and a further fastener extending through the further bore and having an end portion forming the at least part of the further clamping surface which is operable to extend towards the tube to increase the clamping force applied by the further clamping surface. An outer surface of the further fastener and an inner surface of the further bore may comprise cooperating screw threads such that rotating the further fastener in one direction with respect to the further bore extends the end portion of the further fastener towards the tube to increase the clamping force, and rotating the further fastener in the other direction with respect to the further bore retracts the end portion of the further fastener away from the tube to decrease the clamping force.

The second arm may comprise: an additional clamping surface to clamp another portion of optical fiber against the tube when the clamp is fastened around the tube, and an additional clamping mechanism operable to extend at least part of the additional clamping surface towards the tube to increase a clamping force applied by the additional clamping surface. The additional clamping surface may comprise a groove for receiving the other portion of optical fiber. The groove may be offset with respect to a longitudinal axis of the clamp. The additional clamping mechanism may comprise: an additional bore formed in the at least one arm and terminating at the additional clamping surface, and an additional fastener extending through the additional bore and having an end portion forming the at least part of the additional clamping surface which is operable to extend towards the tube to increase the clamping force applied by the additional clamping surface. An outer surface of the additional fastener and an inner surface of the additional bore may comprise cooperating screw threads such that rotating the additional fastener in one direction with respect to the additional bore extends the end portion of the additional fastener towards the tube to increase the clamping force, and rotating the additional fastener in the other direction with respect to the additional bore retracts the end portion of the additional fastener away from the tube to decrease the clamping force.

The clamping surface may be equidistant from the further clamping surface and the additional clamping surface.

The body portion may further comprise a handle.

The resilient portion may comprise each of the first and second arms. The resilient portion may comprise the body portion.

Each of the first and second arms may be arcuate, and the first and second arms, with the body portion, may define a curve of greater than 180 degrees. The first and second arms, with the body portion, may define a curve of between 240 and 300 degrees. A diameter of the curve may be 320 millimeters.

The clamp may be fabricated from an electrically insulating material.

A second aspect provides a method of clamping optical fiber to a tube, the method comprising: positioning a portion of optical fiber against the tube, the optical fiber comprising at least one pair of fiber Bragg gratings; clamping the portion of optical fiber to the tube using a clamp, the clamp comprising a body portion coupled at one end to a first arm and at an opposing end to a second arm, the clamp having a resilient portion to permit the clamp to elastically deform from a closed state in which the clamp is fastened over the portion of optical fiber and around the tube to an open state in which the clamp is radially moveable off the tube, wherein application of a force separating the first and second arms biases the resilient portion and transitions the clamp from the closed state to the open state, and wherein the resilient portion returns the clamp from the open state to the closed state when the force is removed, at least one of the body portion, the first arm and the second arm having a clamping surface to clamp a portion of the optical fiber against the tube when the clamp is fastened around the tube.

A third aspect provides a clamp for clamping optical fiber to a magnetic tube, the clamp comprising a body portion coupled at one end to a first arm and at an opposing end to a second arm, the clamp having a resilient portion to permit the clamp to elastically deform from a closed state in which the clamp is fastened around the tube to an open state in which the clamp is radially moveable off the tube, wherein application of a force separating the first and second arms biases the resilient portion and transitions the clamp from the closed state to the open state, and wherein the resilient portion returns the clamp from the open state to the closed state when the force is removed, at least one of the body portion, the first arm and the second arm having a clamping surface to clamp a portion of the optical fiber against the tube when the clamp is fastened around the tube, and at least one magnet positioned so as to attract the clamping surface towards the tube.

The at least one magnet may be completely enclosed within the at least one of the body portion, the first arm and the second arm. The at least one magnet may comprise an array of magnets. The at least one magnet may comprise a rare earth magnet. Each of the body portion, the first arm and the second arm may comprise a separate clamping surface and a separate at least one magnet.

BRIEF DESCRIPTION OF THE DRAWINGS

In the accompanying drawings, which illustrate one or more example embodiments:

FIGS. 3A to 3F are schematics that depict a clamp in accordance with an embodiment, wherein FIG. 3A is a front view, FIG. 3B is a perspective view, FIG. 3C is a cross-section view taken along line D-D of FIG. 3E, FIG. 3D is a side view, FIG. 3E is a bottom view, and FIG. 3F is an enlarged view of region B of FIG. 3B.

FIGS. 3G and 3H are schematics that depict a clamp in accordance with another embodiment, wherein FIG. 3G is a perspective view of the clamp and FIG. 3H is a perspective view of the clamp when clamping an optical fiber to a tube.

FIGS. 4A and 4B are schematics that depict clamps in accordance with other embodiments, wherein FIG. 4A depicts an embodiment having arms with straight portions, and FIG. 4B depicts an embodiment having arms with both straight and curved portions.

FIGS. 5A to 5D are schematics that depict the clamp of FIGS. 3A to 3F when clamping an optical fiber to a tube, wherein FIG. 5A is a perspective view, FIG. 5B is a side view, FIG. 5C is a front view, and FIG. 5D is a plan view.

FIG. 6 is a front view schematic that depicts a clamp in accordance with another embodiment.

DETAILED DESCRIPTION

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

Optical interferometry is a technique in which two separate light pulses are generated: a sensing pulse and a reference pulse. These pulses may be generated by an optical source such as a laser. When optical interferometry is used for fiber optic sensing applications, the sensing and reference pulses are at least partially reflected back towards an optical receiver. Optical interferometry has a variety of applications, one of which is being used to detect dynamic strain.

Figure 1A:
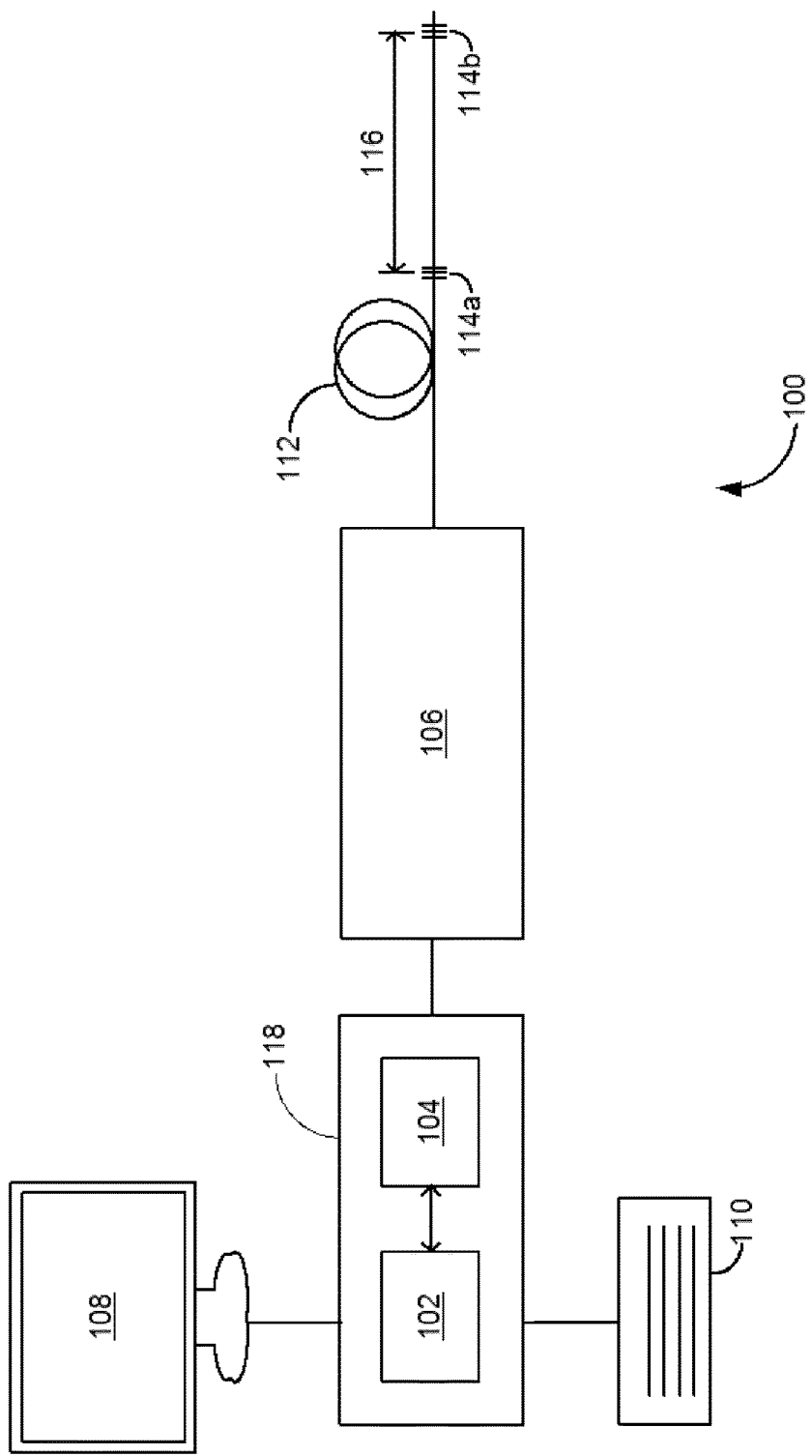
FIG. 1A is a block diagram of a system for detecting dynamic strain, which includes an optical fiber with fiber Bragg gratings ("FBGs") for reflecting a light pulse.

Referring now to FIG. 1A, there is shown one embodiment of a system 100 for performing interferometry using fiber Bragg gratings ("FBGs"). The system 100 comprises optical fiber 112, an interrogator 106 optically coupled to the optical fiber 112, and a signal processing device 118 that is communicative with the interrogator 106.

The optical fiber 112 comprises one or more fiber optic strands, each of which is made from quartz glass (amorphous $SiO_2$). The fiber optic strands are doped with various elements and compounds (including germanium, erbium oxides, and others) to alter their refractive indices, although in alternative embodiments the fiber optic strands may not be doped. Single mode and multimode optical strands of fiber are commercially available from, for example, Corning® Optical Fiber. Example optical fibers include ClearCurve™ fibers (bend insensitive), SMF28 series single mode fibers such as SMF-28 ULL fibers or SMF-28e fibers, and InfiniCor® series multimode fibers.

The interrogator 106 generates the sensing and reference pulses and outputs the reference pulse after the sensing pulse. The pulses are transmitted along optical fiber 112 that comprises a first pair of FBGs. The first pair of FBGs comprises first and second FBGs 114a,b (generally, "FBGs 114"). The first and second FBGs 114a,b are separated by a certain segment 116 of the optical fiber 112 ("fiber segment 116"). The optical length of the fiber segment 116 varies in response to dynamic strain that the fiber segment 116 experiences.

The light pulses have a wavelength identical or very close to the center wavelength of the FBGs 114, which is the wavelength of light the FBGs 114 are designed to partially reflect; for example, typical FBGs 114 are tuned to reflect light in the 1,000 to 2,000 nm wavelength range. The sensing and reference pulses are accordingly each partially reflected by the FBGs 114a,b and return to the interrogator 106. The delay between transmission of the sensing and reference pulses is such that the reference pulse that reflects off the first FBG 114a (hereinafter the "reflected reference pulse") arrives at the optical receiver 103 simultaneously with the sensing pulse that reflects off the second FBG 114b (hereinafter the "reflected sensing pulse"), which permits optical interference to occur.

While FIG. 1A shows only the one pair of FBGs 114a,b, in alternative embodiments (not depicted) any number of FBGs 114 may be on the fiber 112, and time division multiplexing (TDM) (and optionally, wavelength division multiplexing (WDM)) may be used to simultaneously obtain measurements from them. If two or more pairs of FBGs 114 are used, any one of the pairs may be tuned to reflect a different center wavelength than any other of the pairs. Alternatively a group of multiple FBGs 114 may be tuned to reflect a different center wavelength to another group of multiple FBGs 114 and there may be any number of groups of multiple FBGs extending along the optical fiber 112 with each group of FBGs 114 tuned to reflect a different center wavelength. In these example embodiments where different pairs or group of FBGs 114 are tuned to reflect different center wavelengths to other pairs or groups of FBGs 114, WDM may be used in order to transmit and to receive light from the different pairs or groups of FBGs 114, effectively extending the number of FBG pairs or groups that can be used in series along the optical fiber 112 by reducing the effect of optical loss that otherwise would have resulted from light reflecting from the FBGs 114 located on the fiber 112 nearer to the interrogator 106. When different pairs of the FBGs 114 are not tuned to different center wavelengths, TDM is sufficient.

The interrogator 106 emits laser light with a wavelength selected to be identical or sufficiently near the center wavelength of the FBGs 114 that each of the FBGs 114 partially reflects the light back towards the interrogator 106. The timing of the successively transmitted light pulses is such that the light pulses reflected by the first and second FBGs 114a,b interfere with each other at the interrogator 106, which records the resulting interference signal. The strain that the fiber segment 116 experiences alters the optical path length between the two FBGs 114 and thus causes a phase difference to arise between the two interfering pulses. The resultant optical power at the optical receiver 103 can be used to determine this phase difference. Consequently, the interference signal that the interrogator 106 receives varies with the strain the fiber segment 116 is experiencing, which allows the interrogator 106 to estimate the strain the fiber segment 116 experiences from the received optical power. The interrogator 106 digitizes the phase difference ("output signal") whose magnitude and frequency vary directly with the magnitude and frequency of the dynamic strain the fiber segment 116 experiences.

The signal processing device 118 is communicatively coupled to the interrogator 106 to receive the output signal. The signal processing device 118 includes a processor 102 and a non-transitory computer readable medium 104 that are communicatively coupled to each other. An input device 110 and a display 108 interact with the processor 102. The computer readable medium 104 has stored on it program code to cause the processor 102 to perform any suitable signal processing methods to the output signal. For example, if the fiber segment 116 is laid adjacent a region of interest that is simultaneously experiencing vibration at a rate under 20 Hz and acoustics at a rate over 20 Hz, the fiber segment 116 will experience similar strain and the output signal will comprise a superposition of signals representative of that vibration and those acoustics. The processor 102 may apply a low pass filter with a cutoff frequency of 20 Hz to the output signal to isolate the vibration portion of the output signal from the acoustics portion of the output signal. Analogously, to isolate the acoustics portion of the output signal from the vibration portion, the processor 102 may apply a high pass filter with a cutoff frequency of 20 Hz. The processor 102 may also apply more complex signal processing methods to the output signal; example methods include those described in PCT application PCT/CA2012/000018 (publication number WO 2013/102252), the entirety of which is hereby incorporated by reference.

Figure 1B:
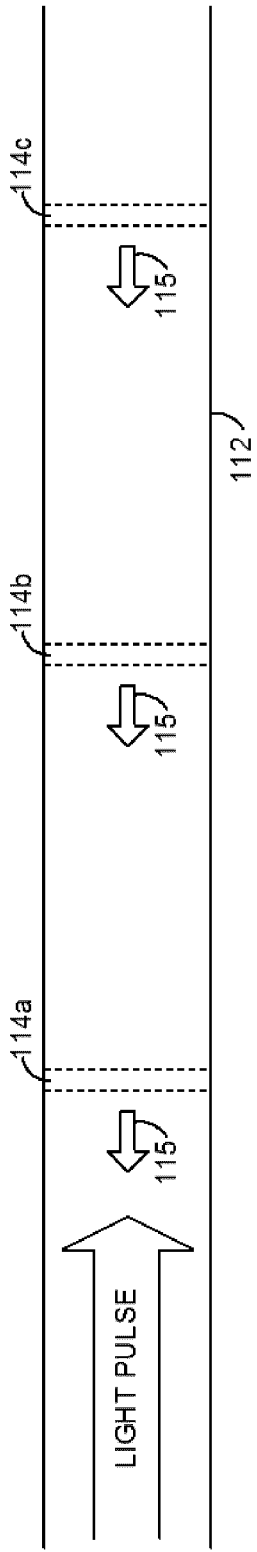
FIG. 1B is a schematic that depicts how the FBGs reflect a light pulse.

FIG. 1B depicts how the FBGs 114 reflect the light pulse, according to another embodiment in which the optical fiber 112 comprises a third FBG 114c. In FIG. 1B, the second FBG 114b is equidistant from each of the first and third FBGs 114a,c when the fiber 112 is not strained. The light pulse is propagating along the fiber 112 and encounters three different FBGs 114, with each of the FBGs 114 reflecting a portion 115 of the pulse back towards the interrogator 106. In embodiments comprising three or more FBGs 114, the portions of the sensing and reference pulses not reflected by the first and second FBGs 114a,b can reflect off the third FBG 114c and any subsequent FBGs 114, resulting in interferometry that can be used to detect strain along the fiber 112 occurring further from the interrogator 106 than the second FBG 114b. For example, in the embodiment of FIG. 1B, a portion of the sensing pulse not reflected by the first and second FBGs 114a,b can reflect off the third FBG 114c and a portion of the reference pulse not reflected by the first FBG 114a can reflect off the second FBG 114b, and these reflected pulses can interfere with each other at the interrogator 106.

Any changes to the optical path length of the fiber segment 116 result in a corresponding phase difference between the reflected reference and sensing pulses at the interrogator 106. Since the two reflected pulses are received as one combined interference pulse, the phase difference between them is embedded in the combined signal. This phase information can be extracted using proper signal processing techniques, such as phase demodulation. The relationship between the optical path of the fiber segment 116 and that phase difference ($\theta$) is as follows:

$$\theta = \frac{2\pi nL}{\lambda}$$

where n is the index of refraction of the optical fiber; L is the physical path length of the fiber segment 116; and λ is the wavelength of the optical pulses. A change in nL is caused by the fiber experiencing longitudinal strain induced by energy being transferred into the fiber. The source of this energy may be, for example, an object outside of the fiber experiencing dynamic strain, undergoing vibration, or emitting energy. As used herein, "dynamic strain", refers to strain that changes over time. Dynamic strain that has a frequency of between about 5 Hz and about 20 Hz is referred to by persons skilled in the art as "vibration", dynamic strain that has a frequency of greater than about 20 Hz is referred to by persons skilled in the art as "acoustics", and dynamic strain that changes at a rate of <1 Hz, such as at 500 µHz, is referred to as "sub-Hz strain".

Figure 1C:
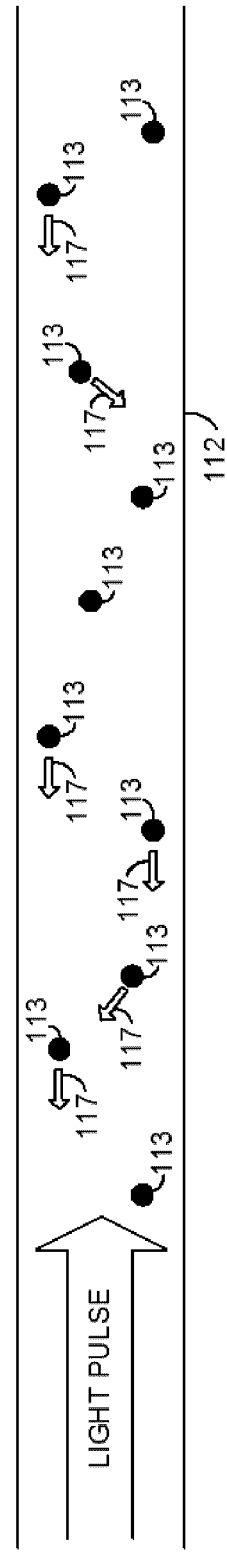
FIG. 1C is a schematic that depicts how a light pulse interacts with impurities in an optical fiber that results in scattered laser light due to Rayleigh scattering, which is used for distributed acoustic sensing ("DAS").

One conventional way of determining Δ nL is by using what is broadly referred to as distributed acoustic sensing ("DAS"). DAS involves laying the fiber 112 through or near a region of interest and then sending a coherent laser pulse along the fiber 112. As shown in FIG. 1C, the laser pulse interacts with impurities 113 in the fiber 112, which results in scattered laser light 117 because of Rayleigh scattering. Vibration or acoustics emanating from the region of interest results in a certain length of the fiber becoming strained, and the optical path change along that length varies directly with the magnitude of that strain. Some of the scattered laser light 117 is back scattered along the fiber 112 and is directed towards the optical receiver 103, and depending on the amount of time required for the scattered light 117 to reach the receiver and the phase of the scattered light 117 as determined at the receiver, the location and magnitude of the vibration or acoustics can be estimated with respect to time. DAS relies on interferometry using the reflected light to estimate the strain the fiber experiences. The amount of light that is reflected is relatively low because it is a subset of the scattered light 117. Consequently, and as evidenced by comparing FIGS. 1B and 1C, Rayleigh scattering transmits less light back towards the optical receiver 103 than using the FBGs 114.

DAS accordingly uses Rayleigh scattering to estimate the magnitude, with respect to time, of the strain experienced by the fiber during an interrogation time window, which is a proxy for the magnitude of the vibration or acoustics emanating from the region of interest. Accordingly, DAS may be performed using fiber 112 without any FBGs.

One application of the above-described technology is to measure strain (e.g. dynamic strain) experienced by a tube. The optical fiber 112 may be fitted to the tube such that strain experienced by the tube is transferred to the optical fiber 112. The strain experienced by the optical fiber 112 may then be measured as described above in order to determine the strain experienced by the tube. Such measurements may be useful in, for example, detecting or predicting damage to the tube. In an embodiment, a series of tubes may be attached to each other, end to end, to form a pipeline, such as a pipeline for transporting a fuel such as a liquid or a gas. The above-described techniques can then be used to monitor the location and magnitude of various strain forces experienced by pipeline and, in this way, the location and severity of damage to individual tubes of the pipeline can be determined. Accordingly, pipeline leak detection can be performed.

It is to be understood that in some embodiments the fiber 112 may include FBGs, for example, when performing interferometry using FBGs. However, in some other embodiments, the fiber 112 may not include FBGs, for example, when performing interferometry using DAS based on Rayleigh scattering.

Pipelines are often formed by welding or bonding together sections of tubes or tubulars. The pipeline may be a subterranean pipeline, but the process of constructing the pipeline from tubes may be performed whilst the tubes are above ground, perhaps supported by temporary stands or supports. Alternatively, the pipeline may be an elevated pipeline, but the process of constructing the pipeline from tubes may be performed whilst the tubes are on the ground or supported by temporary stands or supports.

Figure 2:
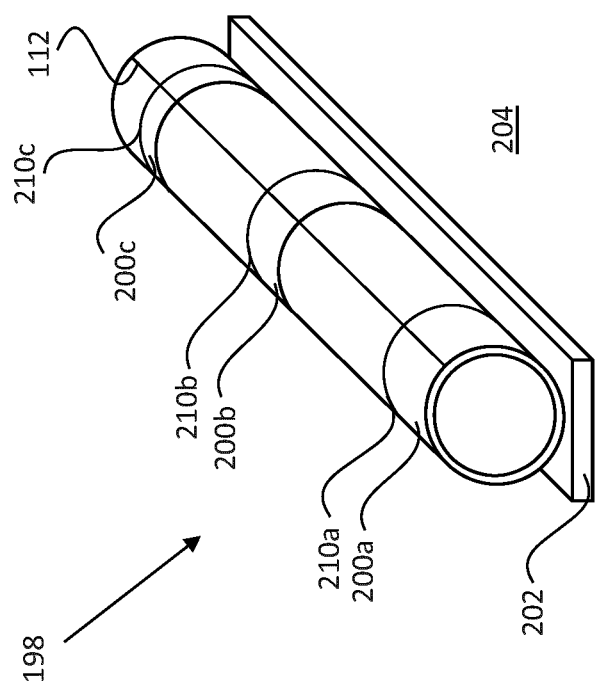
FIG. 2 is a schematic that depicts an example environment in which an embodiment operates.

FIG. 2 depicts an example environment in which an embodiment operates. A pipeline 198 is constructed from a plurality of tubes or tubular sections. Three tubes are identified in FIG. 2 as 200a, 200b and 200c (generally "tubes 200"). In an embodiment, the pipeline 198 may include more or less than three tubes 200, for example, in one embodiment the pipeline includes a single tube and, in another embodiment, the pipeline includes over fifty tubes. Each tube 200 of the pipeline 198 may be bonded to adjacent tubes 200, for example by welding. Also, each tube may be manufactured from any suitable material, such as, for example, metal or a composite material including metal and some other materials.

The pipeline 198 is resting on a temporary support 202 which in turn is resting on the ground 204. Fitted to an outer surface of the pipeline 198 is the optical fiber 112. As mentioned above, the fiber 112 may include one or more fiber optic strands and one or more pairs of FBGs. In some embodiments, however, the fiber 112 may not include any FBGs. As mentioned, the fiber 112 is attached to the pipeline 198 in order to monitor strain, for example, strain of the tubes 200 and joints of the pipeline 198. Specifically, by virtue of the fact that the fiber 112 is connected to the pipeline 198, a strain or change in strain of the tubes 200 and joints causes a corresponding strain or change in strain of the optical fiber 112 which can be measured as described above. The optical fiber 112 can therefore be utilized to monitor strain of the pipeline 198. The fiber 112 may be attached to the pipeline 198 permanently or only temporarily.

The presence of strain, or a change in strain, in one or more tubes 200 of the pipeline 198 may be an indicator that a tube 200 of the pipeline 198 is damaged or is about to be damaged. For example, damage could include a slit in the pipeline 198 such that fuel transported by the pipeline is leaking out of a surface of a tube 200 or from a joint between adjacent tubes 200. A change in magnitude of strain measured using the fiber 112 may indicate stretch, compression, elongation or shear of one or more tubes 200 of the pipeline 198. The magnitude of strain may also indicate severity of the strain being applied to the tube(s) 200, for example, the larger the strain being applied to the tube(s) 200, the greater the magnitude of strain. It follows that the more severe the strain being applied at a particular location of the pipeline 198, the more likely it is that that portion of the pipeline 198 will be compromised and fail in the future.

The fiber 112 may be attached to the pipeline 198 by one or more clamping devices or clamps 210. In an embodiment, the fiber 122 is attached to each tube 200a, 200b and 200c by corresponding clamps 210a, 210b and 210c (generally "clamps 210"). Accordingly, a single clamp 210 is used to attach the fiber 112 to each tube 200 of the pipeline 198. However, in another embodiment, more or less than one clamp 210 may be used for each tube 200 of the pipeline 198, for example, a clamp 210 may only be provided for every two or more tubes 200, or each tube 200 may be provided with two or more clamps 210. In the embodiment of FIG. 2, the fiber 112 is arranged substantially linearly and in-line with a longitudinal axis of the pipeline 198. However, it is to be understood that in some other embodiments, the fiber 112 may be wrapped around at least a portion of the pipeline 198, for example, in a substantially helical formation.

In the present embodiment, the fiber 112 is positioned against the tubes 200 in order to measure strain, for example, via interferometry. However, it is to be understood that in another embodiment, the fiber 112 is positioned against the tubes 200 but for purposes other than measuring strain or interferometry. For example, in an embodiment, the fiber 112 may be part of a optical communications infrastructure between two locations. For example, the fiber 112 may transmit encoded voice or data signals in the form of light pulses between different parties at the two locations. In this case, the pipeline 198 also extends between the same two locations and thereby provides a convenient means to which the fiber 112 may be attached. In such communications embodiments, the fiber 112 would not include any FBGs.

FIGS. 3A to 3F illustrate in detail a clamp 210 for clamping fiber 112 to one of the tubes 200 in accordance with an embodiment. The clamp 210 includes a body portion 300 and two arms 302a and 302b (generally "arms 302"). Each of the arms 302 has a proximal end portion 306a, 306b and a distal end portion 308a, 308b. Each proximal end portion 306a, 306b is coupled to a different opposing end of the body portion 300 whilst each distal end portion 308a, 308b is free, that is, not coupled to anything.

In an embodiment, the arms 302 are arcuate and, with the body portion 300, are arranged to define a curve of greater than 180 degrees, such as, between 240 degrees and 300 degrees. In this way, the arms 302 and the body portion 300 may define a portion of an ellipse and that portion may account for more than 180 degrees of the ellipse. The ellipse may be a circle but, alternatively, the ellipse may be eccentric (e.g. not a perfect circle). In an embodiment, the shape defined by the arms 302 and the body portion 300 is substantially C-shape.

In the embodiment of FIGS. 3A to 3F, a cross-section of the arms 302 is substantially square shaped. However, in some other embodiments, the cross-section may have a different shape, for example, the cross-section may be substantially triangular or circular.

In an embodiment, the body portion 300 includes a handle 310 and a fiber clamping surface 312. The fiber clamping surface 312 clamps a portion of fiber 112 against the tube 200 when the clamp 210 is fastened around the tube 200, as will be described below. Also, as seen more particularly in FIGS. 3A to 3C, the clamping surface 312 may include a groove 314 which is substantially aligned with a longitudinal axis 316 of the clamp 210. The groove 314 may be sized and shaped so that the fiber 112 is completely or only partially contained therein. In this way, the groove 314 may provide an alignment mechanism of the clamp 210. In an embodiment, the groove 314 has a semi-circular cross-section and a diameter of the semi-circle is just larger than a diameter of the fiber 112.

Figure 3D:
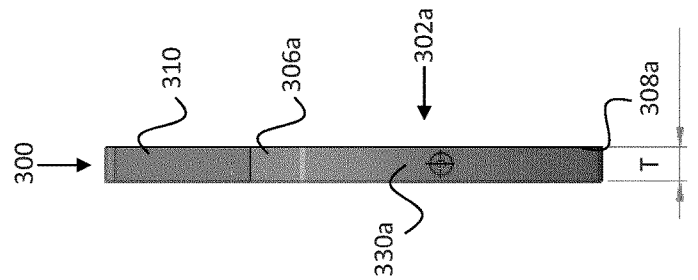
Figure 3A:
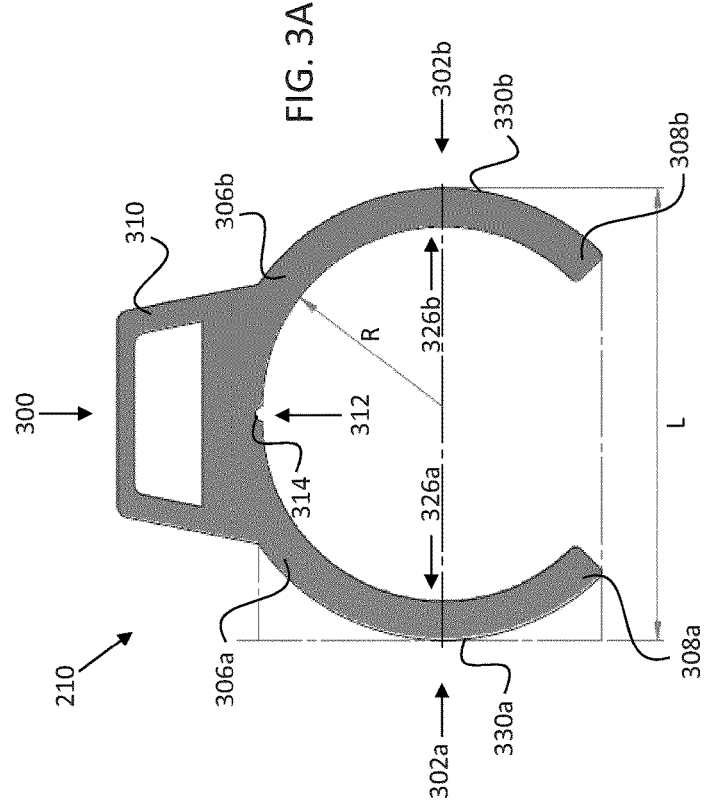
Figure 3E:
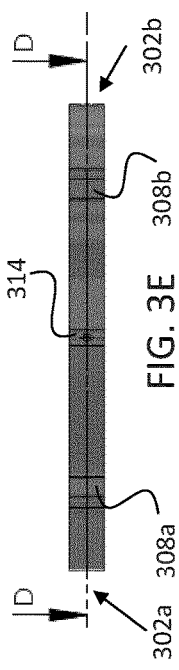
Figure 3F:
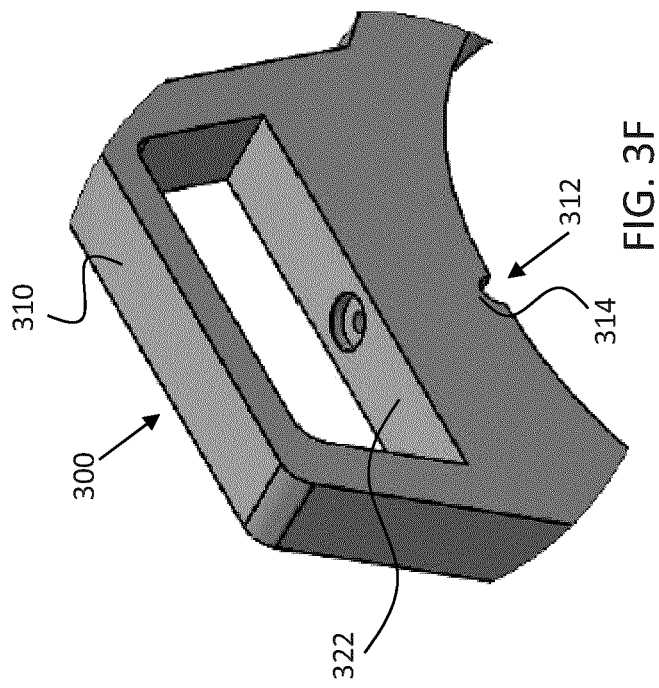
Figure 3B:
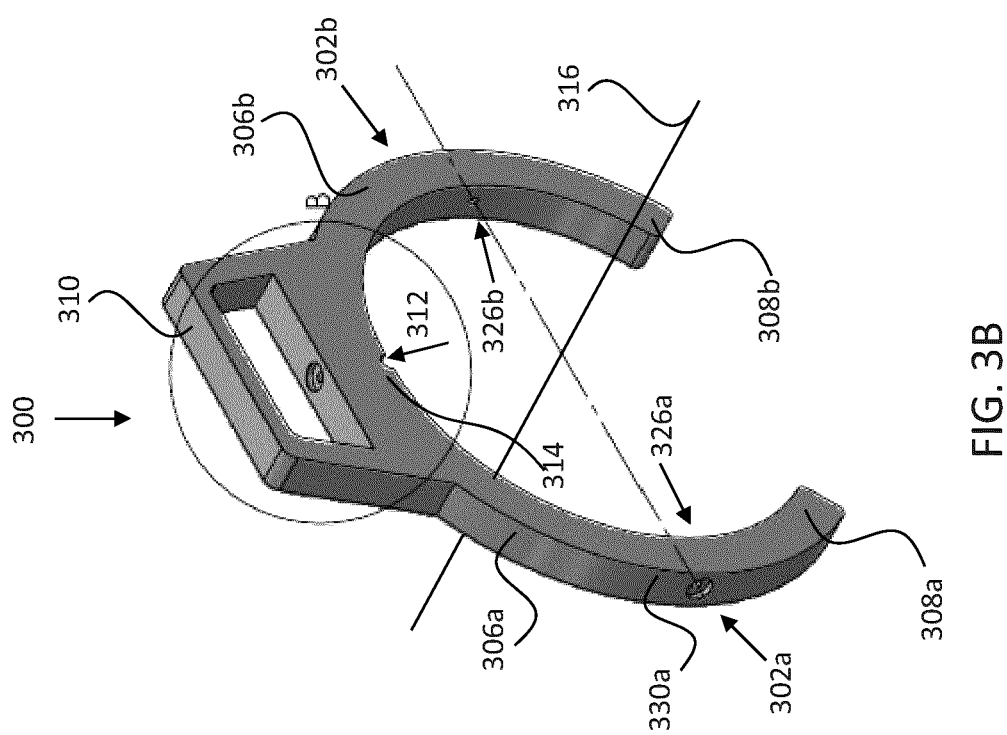
Figure 3C:
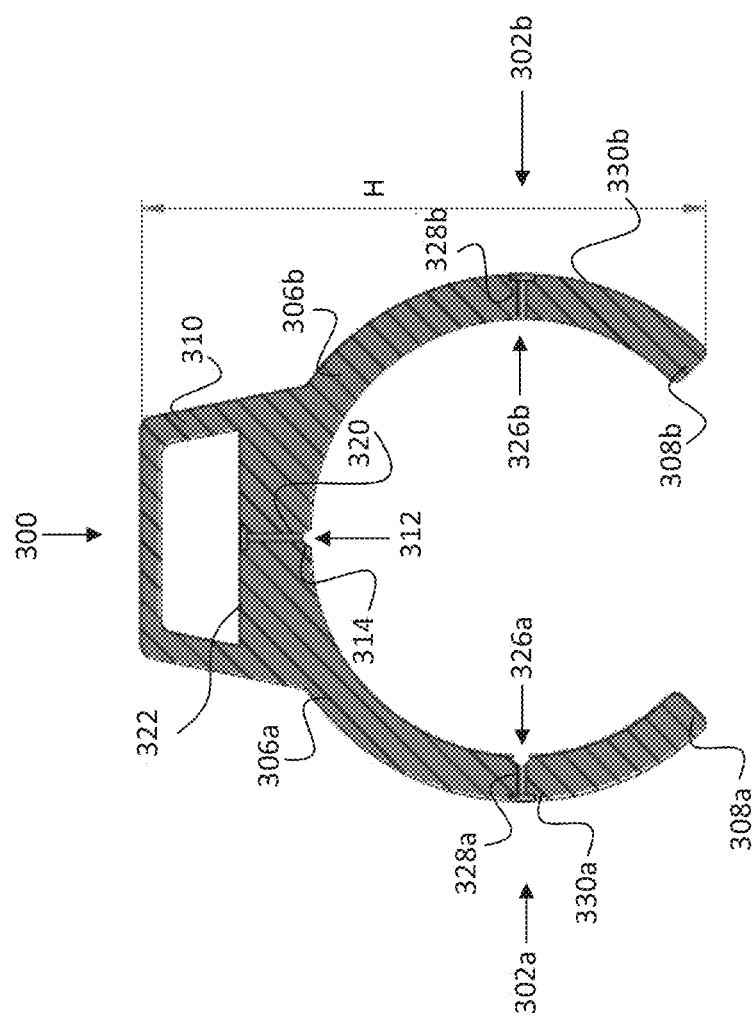
Figure 5A:
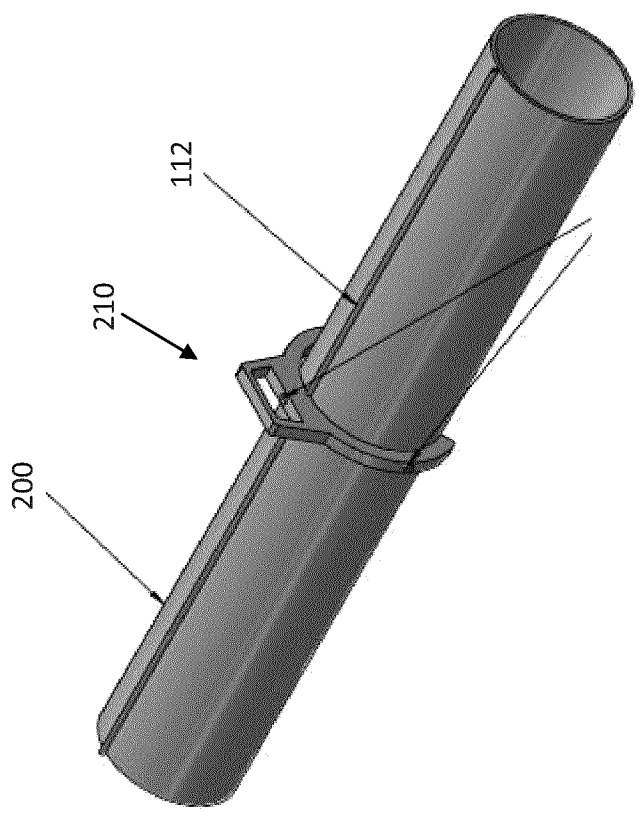

Example dimensions of the embodiment of FIGS. 3A to 3F are as follows: an outer diameter (L) of the C-shape when measured horizontally considering the orientation of FIG. 3A is 400 millimeters and the inner diameter (2R) is 320 millimeters; a thickness (T) of the clamp 210 along the longitudinal axis 316 is 30 millimeters; a height (H) of the clamp 210 when measured vertically considering the orientation of FIG. 3C is 430 millimeters. Accordingly, the clamp 210 may be sized to fit a tube 200 having an outer diameter of just less than 320 millimeters. It is to be understood that one or more of the dimensions mentioned above may be different in some embodiments. Also, different sizes of clamps may be formed for operation with different sizes of tubes. It is also to be understood that each of these dimensions may have a tolerance of ±5 millimeters.

As seen more particularly on FIGS. 3G and 3H, in an embodiment in which the fiber 112 is wrapped around the pipeline 198 in a substantially helical or spiral formation, a modified version of the clamp 210' includes a modified groove 314' that is offset with respect to the longitudinal axis 316. That is, the groove 314' is not in-line with, but is at an angle with respect to, the longitudinal axis 316. In an embodiment, the angle is any value between 2 and 85 degrees, such as, for example, 5 degrees, 10 degrees or 45 degrees.

It is to be understood that in some other embodiments, the arms 302 may not be arcuate or they may have an arcuate portion and a non-arcuate portion. For example, as seen more particularly in FIG. 4A, in one embodiment, the arms 302' include only straight sections with two 90 degree bends and, as such, resemble a "[" shape or "]" shape. As seen more particularly in FIG. 4B, in another embodiment, the arms 302" may generally be curved, but have straight sections at their proximal and distal end portions. In even further embodiments, the arms 302 may have or may include a wave-shaped portion. Whilst the following description is equally applicable to the embodiments of FIGS. 4A and 4B, for clarity, reference will be made only to the embodiment of FIGS. 3A to 3F.

As seen more particularly on FIGS. 5A to 5D, the clamp 210 has a resilient portion to permit the clamp 210 to elastically deform from a closed state in which the clamp 210 is fastened around the tube 200 to an open state in which the clamp is radially moveable off the tube 200. It is the application of a force separating (e.g. pushing or pulling apart) the arms 302 which biases the resilient portion and transitions the clamp 210 from the closed state to the open state. Also, the resilient portion returns the clamp 210 from the open state to the closed state when the force is removed or reduced below a threshold. It is the resiliency or elasticity of the resilient portion which causes the clamp to spring-back or recoil from the open state to the closed state on removal of the force.

In the present embodiment, the resilient portion includes the arms 302 and the body portion 300. However, in another embodiment the resilient portion may include only the arms 302 or only the body portion 300. For example, the body portion 300 may be rigid or not deformable and the arms 302 may be resiliently flexible, or the body portion 300 may be resiliently flexible and the arms 302 may be rigid or not deformable. In another embodiment, the resilient portion may include only part of the arms 302 or body portion 300. For example, the resilient portion may include only the proximal end portions 306a, 306b of the arms 302 and the remaining portions of the arms 302 may be rigid or not deformable. Alternatively, only the end portions of the body portion 300 which are coupled to the arms 302 may be resiliently flexible and the remaining portion of the body portion 300 may be rigid or not deformable.

In the above described embodiments, the arms 302 do not enclose the complete circumference of the tube 200. In this way, the clamp 210 may be easier to fit to the tube because the arms 302 may need to be splayed or separated less than if the arms 302 were long enough for the clamp 210 to completely enclose the tube 200. However, in some embodiments, the arms 302 are sized and/or shaped differently so as to completely enclose the tube 200 cross-section. In this case, the clamp 210 may be less prone to becoming dislodged, for example, when inadvertently hit by a foreign object.

Returning to the present embodiment, the body portion 300 and each of the arms 302 is deformable such that the distal end portions 308a and 308b can be forced apart in order to fit the clamp 210 over the tube 200. Additionally, body portion 300 and each of the arms 302 is resiliently biased by the force forcing apart the distal end portions 308a and 308b such that removal of the force urges the distal end portions 308a and 308b towards each other to fasten the clamp 210 around the tube 200 or to secure the clamp 210 to the tube 200. In the present embodiment, the resilient portion includes the body portion 300 and the arms 302; however, the body portion 300 and each of the arms 302 may not contribute equally to the resilience or elasticity which causes the clamp 210 to transition from the open state to the closed state when a force pushing apart the arms 302 is removed or reduced. For instance, due to the shape and dimensions of the clamp 210, the arms 302 may contribute more than the body portion 300. Further, the proximal end portions 306a, 306b may contribute more than the remaining portions of the arms 302.

In view of the above, the clamp 210 may be moved between the open configuration and the closed configuration. In the closed configuration, the arms 302 may adopt a shape substantially as shown in FIGS. 3A to 3C. In this configuration, little or no force may be applied to the arms 302 and they may assume their natural unstressed shape. Also, the gap between the distal end portions 308a and 308b may be too small for the clamp 210 to fit over the tube 200. In the open configuration, the distal end portions 308a and 308b are forced further apart than as shown in FIGS. 3A to 3C such that the clamp 210 can be fitted over or around the tube 200. The force may be applied by an operator of the clamp 210 physically pulling the distal end portions 308a and 308b apart in opposite directions. Additionally, the force may be applied by pushing the clamp 210 onto the outer surface of the tube 200 so that the rounded outer surface of the tube 200 imparts a separating force on the distal end portions 308a and 308b. In this latter case, the operator may use the handle 310 to orientate the clamp 210 whilst pushing it onto the tube 200 as described. The chosen orientation may be to align or at least substantially align the longitudinal axis 316 of the clamp 210 with a longitudinal axis of the tube 200. In any case, the arms 302 and the body portion 300 may be deformed to fit the clamp 210 over the tube 200.

Once the clamp 210 has been fitted over the tube 200 the force on the distal end portions 308a and 308b may be reduced or removed. In the case where an operator is forcing the arms 301 apart, the operator may simply remove the force. In the case where the clamp 210 is pushed onto the tube 200, once half of the cross-section of the tube 200 is between the arms 302, pushing the clamp 210 further onto the tube 200 causes a reduction in the separation force applied by the tube 200 to the distal end portions 308a and 308b until the separation force is reduced to a minimum once the clamp 210 is fully fitted around the tube 200. In this way, the claim 210 may be snap fitted onto the tube 200. Whilst the clamp 210 is secured to the tube 200, the tube 200 may still impart some separation force on the arms 302 based on the relative dimensions of the clamp 210 and the tube 200. For example, if the diameter of the curve defined by the body portion 300 and the arms 302 when they are in their natural unstressed rest state is slightly greater than an outer diameter of the tube 200, little or no separation force will be exerted on the clamp 210 by the tube 200. On the other hand, if the diameter of the unstressed curve is less than the outer diameter of the tube 200, some separation force will be exerted on the claim 210 by the tube 200. In either case, the state of the clamp 210 when it is secured to the tube 200 is referred to as the closed state. However, depending on the relative dimensions of the clamp 210 and the tube 200, the closed state will include both a completely closed situation, when the clamp 210 is in its natural unstressed rest state and no separation force is applied to the clamp 210 by the tube 200, and a partially closed situation, when some separation force is applied to the clamp 210 by the tube 200.

The deformability and elasticity of the resilient portion (for example, the arms 302 and the body portion 300) may be provided by a material from which the resilient portion is formed. The material may be chosen because its material properties provide sufficient ductility or flexibility for the arms 302 to be positioned around the tube 200. Additionally, the material may be chosen because its material properties provide sufficient elasticity and tensile strength so that the arms 302 snap back into shape to fasten or secure the clamp 210 to the tube 200. In an embodiment, the resilient portion is made from spring steel or an injection molded plastic such as high density polyethylene or resin. In another embodiment, the resilient portion is made of any material that can be machined with an additive or subtractive method (e.g. a metal composition), or any material or combination of materials that can be injection molded (e.g. plastics, rubbers, glass filled resins, carbon/composite fiber). In an embodiment, the whole clamp 210 may be made from the same material in order to simplify manufacture. For example, the whole clamp 210 may be fabricated by an injection molding process. In another embodiment in which the clamp 210 includes both a rigid portion and a resilient portion, the material used to form the rigid portion may be different to the material used to form the resilient portion. For example, the rigid portion may be made from any metal whereas the resilient portion may be made of any injection molded element.

In an embodiment, the resilient portion or the clamp 210 is made from a material which can operate in a wide range of different temperatures (e.g. −40 degrees Celsius to 80 degrees Celsius). For example, the material does not become brittle and non-flexible at temperatures down to −40 degrees Celsius. Accordingly, the resilient portion or clamp 210 can be used in a wide variety of different applications and geographical locations.

In an embodiment, the clamp 210 may be fabricated from an electrically insulating material in order to ensure that there is no opportunity for cathodic corrosion of the tube 200 by the clamp 210.

In another embodiment, for example, in which the resilient portion is provided by only the proximal end portions 306a and 306b, an elastic device (e.g. a spring) may provide the resilient property. For example, the whole of the body portion 300 and all of the arms 302 except the proximal end portions 306a and 306b may be made of a rigid or non-deformable material. However, both proximal end portions 306a and 306b may include a helical spring or spring-loaded hinge which permits the clamp 210 to elastically deform from the closed state, in which the clamp 210 is fastened around the tube, to the open state, in which the clamp 210 is radially moveable off the tube. In this case, the helical springs or spring-loaded hinges are biased to transition the clamp 210 from the open state to the closed state when a force separating the arms 302 is removed.

Based on the above-described operation of the clamp 210, the clamp 210 may be used to clamp the fiber 112 to the tube 200. Specifically, the fiber 112 may be positioned linearly against an outer surface of the tube 200 and a portion of the fiber 112 to be clamped to the tube 200 may be identified. Next, the clamp 210 may be moved into its open state by forcing apart the arms 302 so that the clamp 210 can be fitted over the identified portion of fiber 112 and the tube 200. Next, the clamp 210 may be aligned with respect to the fiber 112 such that the clamping surface 312 is adjacent the identified portion of fiber 112 to be clamped. Finally, the clamp 210 may be snapped back into its closed state by the resilient portion by removing the force applied to the arms 302. In this way, the clamp 210 is fastened around the tube 200 and clamp 210 clamps the identified portion of fiber 112 against the tube 200.

In an embodiment, the identified portion of fiber 112 is clamped directly to the outer surface of the tube 200 such that there are no intermediate elements between the portion of fiber 112 and the tube 200. In this way, loss in the transmission of strain experienced by the tube 200 to the fiber 112 may be reduced. In another embodiment, one or more intermediate elements may be present between the fiber 112 and the tube 200, such as, for example, one or more protective layers. In this way, an outer surface of the tube 200 may be protected from damage. In an embodiment, the fiber 112 is a fiber in metal tube (FIMT).

Additionally, the clamp 210 may be removed from the tube 200 in order to stop clamping the fiber 112 to the tube 200. Specifically, the clamp 210 may be moved into its open state by forcing apart the arms 302. Next, the clamp 210 can be removed from the tube 200 whilst in the open state. Finally, the clamp 210 may be permitted to return to its closed state by removing the force applied to the arms 302. In this way, the clamp 210 can temporarily clamp the fiber 112 to the tube 200. On the other hand, the clamp 210 can remain in-situ and thereby permanently clamp the fiber 112 to the tube 200. It is also noted that the clamp 210 may be removed from the tube 200 simply by holding the handle 310 and pulling the clamp 210 away from the tube 200. In this way, the tube 200 exerts a separating force to the arms 302 to transition the clamp 210 from the closed state to the open state.

In view of the above, the clamp 210 provides a permanent or temporary means by which to clamp the optical fiber 112 to the tube 200. Since the clamp 210 secures to the tube 200 using only a radial retaining force maintained by the resilient portion, the strength of the fastening is stronger than prior art methods which utilize adhesive tape to secure the fiber 112 to the tube 200. Also, the outer surface of the tube 200 is not damaged during the clamping process, that is, no fastening means such as adhesives, screws, bolts or nails are used which could damage an outer surface of the tube 200. In this regard, it is noted that the tube 200 may include an outer protective coating which should not be damaged during the clamping process. Further, since the clamp 210 can be snap-fitted to the tube 200, no additional tools or devices are needed to use the clamp 210 to clamp the fiber 112 to the tube 200. Furthermore, since the snap fit operation is quick and simple to perform, the clamp 210 is advantageous over more time consuming prior art solutions in which a banding is wrapped completely around the tube 200 and then secured in place using a locking mechanism.

In an embodiment, the clamp 210 may contain further features for increasing a clamping force applied to the fiber 112 when the fiber 112 is clamped to the tube 200. In an embodiment, the body portion 300 includes a clamping mechanism which is operable to extend at least part of the clamping surface 312 towards the tube 200 when the clamp 210 is fastened around the tube 200 to increase a clamping force applied to the portion of fiber 112 clamped against the tube 200 by the clamp 210.

As seen more particularly on FIG. 3C, in an embodiment, the clamping mechanism includes a bore 320 formed in the body portion 300. One end of the bore 320 terminates at an aperture in the clamping surface 312 and another end of the bore 320 terminates at an aperture in a surface 322 of the body portion 300 which is opposite to the clamping surface 312. In an embodiment, the aperture in the surface 322 may be countersunk. The clamping mechanism also includes a fastener (not shown) contained within the bore 320. In an embodiment, the fastener may be an elongate fastener, such as, a screw. The fastener may be inserted into the bore 320 through the aperture in the surface 322. Once the fastener is contained within the bore 320, a tip or end portion of the fastener forms a part of the clamping surface 312. In this way, protruding the end of the fastener out of the aperture in the clamping surface 322 causes a portion of the clamping surface 312 to be extended away from the rest of the body portion 300 so that a clamping force applied by the clamping surface 312 can be increased. On the other hand, retracting the end of the fastener towards the handle 310 of the body portion 300 can reduce the clamping force applied by the clamping surface 312. Accordingly, moving the fastener with respect to the bore 320 to vary an amount of the end portion of the fastener which protrudes beyond the aperture in the clamping surface 312 varies a clamping force applied by the clamp 210.

In an embodiment, an outer surface of the fastener and an inner surface of the bore 320 include cooperating screw threads such that rotating the fastener in one direction with respect to the bore 320 extends the end portion of the fastener towards the tube 200 to increase the clamping force applied by the clamping surface 312. Also, rotating the fastener in the other direction with respect to the bore 320 retracts the end portion of the fastener away from the tube 200 to decrease the clamping force applied by the clamping surface 312. In this way, the fiber 112 can be clamped to the tube 200 by simply installing the clamp 210 over the fiber 112 and the tube 200. Once the clamp 210 is in place, a fastener may be inserted into the bore 320 and screwed-in until the end of the fastener protrudes out of the aperture in the clamping surface 312 and thereby bears onto the fiber 112 to increase the clamping force applied thereto. In the event that the clamping force needs to be reduced, the fastener can be unscrewed until the clamping force applied by the clamping surface 312 has been reduced to the required amount.

In an embodiment, the clamp 210 may contain one or more further clamping surfaces. As seen more particularly in FIG. 3C, the arm 302a may include further clamping surface 326a and the arm 302b may include further clamping surface 326b. The clamping surface 312 and each further clamping surface 326a and 326b are each for clamping a different optical fiber. In this way, three different optical fibers may be clamped to the tube 200 by a single clamp 201, or one optical fiber may be placed in any of the three difference locations. Whilst not shown in FIGS. 3A and 3B, the clamping surface 326a and/or the clamping surface 326b may have a groove corresponding to the groove 314 of clamping surface 312 (as depicted in FIG. 3C in connection with the clamping surface 326a). In this way, alignment of the clamping surfaces 326a and 326b with respect to their respective optical fibers may be simplified.

In an embodiment, each of the arms 302a, 302b includes a further clamping mechanism operable to extend at least part of the further clamping surfaces 326a, 326b towards the tube 200 to increase a clamping force applied by the further clamping surfaces 326a, 326b. The clamping mechanism associated with each arm 302a, 302b may be analogous to the above-described clamping mechanism associated with the body portion 300. In particular, the clamping mechanism of the arm 302a may include a bore 328a formed in the arm 302a. One end of the bore 328a terminates at an aperture in the clamping surface 326a and another end of the bore 328a terminates at an aperture in a surface 330a of the arm 302a which is opposite to the clamping surface 326a. In an embodiment, the aperture in the surface 330a may be countersunk. The clamping mechanism also includes a fastener (not shown) contained within the bore 326a. As before, the fastener may be an elongate fastener, such as, a screw. The fastener may be inserted into the bore 326a through the aperture in the surface 330a. Once the fastener is contained within the bore 328a, a tip or end portion of the fastener forms a part of the clamping surface 326a. In this way, protruding the end of the fastener out of the aperture in the clamping surface 330a causes a portion of the clamping surface 326a to be extended away from the rest of the arm 302a so that a clamping force applied by the clamping surface 326a can be increased. On the other hand, retracting the end of the fastener towards the rest of the arm 320a can reduce the clamping force applied by the clamping surface 326a. Accordingly, moving the fastener with respect to the bore 328a to vary an amount of the end portion of the fastener which protrudes beyond the aperture in the clamping surface 326a varies a clamping force applied by the clamp 210.

In an embodiment, an outer surface of the fastener and an inner surface of the bore 328a include cooperating screw threads such that rotating the fastener in one direction with respect to the bore 328a extends the end portion of the fastener towards the tube 200 to increase the clamping force applied by the clamping surface 326a. Also, rotating the fastener in the other direction with respect to the bore 328a retracts the end portion of the fastener away from the tube 200 to decrease the clamping force applied by the clamping surface 326a. In this way, the clamp 210 can be installed over the fiber to be clamped by the arm 302a and the tube 200. Once the clamp 210 is in place, a fastener may be inserted into the bore 328a and screwed in until the end of the fastener protrudes out of the aperture in the clamping surface 326a and thereby bears onto the fiber to be clamped to increase the clamping force applied thereto. In the event that the clamping force needs to be reduced, the fastener can be unscrewed until the clamping force is reduced to the required amount.

The clamping mechanism of the arm 302a is analogous to the above-described clamping mechanism of the arm 302b. Therefore, the above description applies equally to the clamping mechanism of the arm 302b.

In view of the above, the clamp 210 may contain three clamping surfaces, clamping surface 312 of the body portion 300, clamping surface 326a of the arm 302a, and clamping surface 326b of the arm 302b. Additionally, the clamp 210 can contain three clamping mechanisms, one associated with each of the clamping surfaces 312, 326a and 326b. In this way, the clamp 210 can be used to claim three different optical fibers to the tube 200, or place one optical fiber in one of the three different locations. It is to be understood that the three fibers may be linearly arranged around the circumference of the tube 200 such that each fiber is substantially parallel to the other fibers and in line with a longitudinal axis of the tube 200. Additionally, the three fibers may be spiraled around the circumference of the tube 200 such that each fiber remains equally spaced from the other fibers and does not cross over the other fibers.

As seen more particularly in FIGS. 3A to 3C, the clamping surface 312 may be equidistant from both the clamping surfaces 326a and 326b. Specifically, the clamping surface 312 may be 90 degrees from each of the clamping surfaces 326a and 326b. However, in some other embodiments, the clamping surfaces may be positioned differently on the clamp 210. For example, rather than the clamping surfaces being positioned substantially centrally on their associated element (e.g. the body portion 300, the arm 302a or the arm 302b), one or more of the clamping surfaces may be off-set with respect to the center of its associated element. For example, the clamping surface 326a may be positioned at or close to the distal end portion 308a of the arm 302a, and the clamping surface 326b may be positioned at or close to the distal end portion 308b of the arm 302b. In this way, the clamping surfaces 312, 326a and 326b may be equally spaced from each other around the circumference of the tube 200.

It is to be understood that in some embodiments, one or more of the clamping surfaces 312, 326a and 326b, including their associated clamping mechanisms, may be omitted. For example, the arms 302a and 302b may include the clamping surfaces 326a and 326b together with their associated clamping mechanisms, but the clamping surface 312 together with its associated clamping mechanism may be omitted. Alternatively, only the clamping surface 312 together with its associated clamping mechanism may be provided. Further, one of the arms 302 may include a clamping surface and associated clamping mechanism but the other arm may not. It is also to be understood that in some embodiments, any one of the body portion 300, the arm 302a and the arm 302b may include more than one clamping surface and associated clamping mechanism. For example, two or more clamping surfaces each with an associated clamping mechanism may be positioned side-by-side on the body portion 300, the arm 302a or the arm 302b. Accordingly, the clamp 210 may be customized to clamp different numbers of optical fibers to the tube 200.

It is to be understood that in some other embodiments, the clamping mechanism is provided by means other than the bore and fastener arrangement described above. For example, in one other embodiment, a button-actuated ratchet-based mechanism is used to advance or retract a rod or a spring within a bore. Such a mechanism may be similar to that used in mechanical pencils and may be actuated by a spring-loaded button. FIG. 6 illustrates an embodiment in which the clamping mechanism is provided by magnets.

In FIG. 6, a clamp 400 is shown having a similar construction as the above-described clamp 210. It is to be understood that the clamp 400 is the same as the clamp 210 except that that the clamp 400 does not include the above-described fastener and bore type clamping mechanisms. Instead, the clamping mechanisms of clamp 400 include magnets. Specifically, the body portion 300 includes an array 402 of magnets 402a, 402b and 402c; the arm 302a includes an array 404 of magnets 404a, 404b and 404c; and, the arm 302b includes an array 406 of magnets 406a, 406b and 406c. Each array 402 to 406 is completely enclosed in its respective element (e.g. the body portion 300 or the arms 302a and 302b). The tube 200 is magnetic, for example, the tube 200 is made of a ferrous metal. It is to be understood that magnetic is taken to mean that the tube 200 is capable of being attracted by a magnet. In use, a force of magnetic attraction pulls the array 402 and tube 200 together. Since the array 402 is fixed to the body portion 300, the body portion 300 and its associated clamping surface 312 are effectively pulled towards the tube 200 thereby increasing a clamping force applied by the clamping surface 312. In an embodiment, the array 402 is adjacent to the clamping surface 312. In an embodiment, the array 402 is behind the clamping surface 312 or overlays a portion of clamping surface 312. In this way, the clamping surface is sandwiched in-between the array 402 and the tube 200 such that the magnetic attraction force squeezes the fiber 112 between the clamping surface 312 and the tube 200. Accordingly, the array 402 is positioned so as to attract the clamping surface 312 towards the tube 200. It is to be understood that the same principles apply to the arrays 404 and 406 and, as such, the arrays 404 and 406 function to increase a clamping force applied by the clamping surfaces associated with each of arms 302a and 302b. Accordingly, each clamping mechanism of the clamp 400 is provided by one of the arrays 402 to 406. Also, the magnets do not distort the arms 302a and 302b or scratch an outer coating of the tube 200.

In the embodiment of FIG. 6, each array 402 to 406 includes three separate magnets; however, in some other embodiments, one or more of the arrays includes more or less than three magnets, for example, two, five or ten magnets. Further, in one other embodiment, a single magnet is used instead of one or more of the arrays 402 to 406. In the embodiment of FIG. 6, each magnet is substantially oblong or rectangular in cross-section and generally has a rectangular prism shape; however, in another embodiment, one or more of the magnets has a different shape, such as, a cube or a sphere or an arc. In the embodiment of FIG. 6, a separate array is provided on each of the body portion 300, the arm 302a and the arm 302b; however, in another embodiment, one or more of the arrays 402 to 406 may be omitted. Also, in another embodiment, a single array may be formed along a majority of the inside surface of the clamp 400, that is, the surface which abuts the tube 200. In another embodiment, more than three arrays may be provided on the clamp 400. In the embodiment of FIG. 6, the magnets are completely enclosed in their respective clamp portion (e.g. the body portion 300, the arm 302a or the arm 302b); however, in another embodiment, one or more of the magnets may be only partially enclosed or may protrude from the clamp 400. For example, the magnets may be incorporated into the clamp during an injection molding process. In an embodiment, one or more of the magnets are rare earth magnets.

In an embodiment including an array of magnets, each magnet in the array is selected to provide a different magnetic attraction force to other magnets in the array. For example, a size or material of the magnets may be varied to provide different magnetic attraction forces. In this way, a magnetic attracting force may be maximized at a certain location in the array, for example, an end or the middle of the array.

The following describes another embodiment which is different to the embodiments described above. In this other embodiment, the clamp does not include a clamping mechanism; however, all other aspects of the clamp may be as described above. For example, as before, the clamp includes a body portion coupled at one end to a first arm and at an opposing end to a second arm. The clamp has a resilient portion to permit the clamp to elastically deform from a closed state in which the clamp is fastened around the tube to an open state in which the clamp is radially moveable off the tube. Application of a force separating the first and second arms biases the resilient portion and transitions the clamp from the closed state to the open state and the resilient portion returns the clamp from the open state to the closed state when the force is removed. Further, at least one of the body portion, the first arm and the second arm have a clamping surface to clamp a portion of the optical fiber against the tube when the clamp is fastened around the tube. In an embodiment, the clamping surface may include a groove for receiving the portion of the optical fiber.

In this other embodiment, the clamp is used to clamp an optical fiber having at least one pair of fiber Bragg gratings, as described above with reference to FIGS. 1A to 1C. It is to be understood that the fiber may include two or more pairs of fiber Bragg gratings. In use, the optical fiber may simply be trapped or sandwiched in-between the outer surface of the tube and the clamping surface, such as, for example, on the body portion or one of the arms. Specifically, a portion of the optical fiber may be positioned against the tube. Then, the portion of the optical fiber may be clamped by securing the clamp to the tube over the portion of the optical fiber such that the clamping surface clamps the portion of optical fiber to the tube.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A clamp for clamping optical fiber to a tube, the clamp comprising a body portion coupled at one end to a first arm and at an opposing end to a second arm,
   the clamp having a resilient portion to permit the clamp to elastically deform from a closed state in which the clamp is fastened around the tube to an open state in which the clamp is radially moveable off the tube, wherein application of a force separating the first and second arms biases the resilient portion and transitions the clamp from the closed state to the open state, and wherein the resilient portion returns the clamp from the open state to the closed state when the force is removed,
   at least one of the body portion, the first arm and the second arm having a clamping surface to clamp a portion of the optical fiber against the tube when the clamp is fastened around the tube, wherein the clamping surface comprises a groove sized to receive within the groove the portion of the optical fiber; and a clamping mechanism comprising a bore and a fastener extending through the bore and having an end portion forming at least part of the clamping surface, the clamping mechanism being operable to extend the fastener towards the tube and thereby extend the at least part of the clamping surface towards the tube when the clamp is secured to the tube to increase a clamping force applied by the clamping surface.

2. The clamp of claim 1, wherein:
   the bore is formed in the body portion and terminates at the clamping surface.

3. The clamp of claim 1, wherein an outer surface of the fastener and an inner surface of the bore comprise cooperating screw threads such that rotating the fastener in one direction with respect to the bore extends the end portion of the fastener towards the tube to increase the clamping force, and rotating the fastener in the other direction with respect to the bore retracts the end portion of the fastener away from the tube to decrease the clamping force.

4. The clamp of claim 1, wherein the first arm comprises:
a further clamping surface to clamp another portion of optical fiber against the tube when the clamp is fastened around the tube, and
a further clamping mechanism operable to extend at least part of the further clamping surface towards the tube to increase a clamping force applied by the further clamping surface.

5. The clamp of claim 4, wherein the further clamping surface comprises a groove for receiving the other portion of optical fiber.

6. The clamp of claim 5, wherein the further clamping mechanism comprises:
a further bore formed in the at least one arm and terminating at the further clamping surface, and
a further fastener extending through the further bore and having an end portion forming the at least part of the further clamping surface which is operable to extend towards the tube to increase the clamping force applied by the further clamping surface.

7. The clamp of claim 6, wherein an outer surface of the further fastener and an inner surface of the further bore comprise cooperating screw threads such that rotating the further fastener in one direction with respect to the further bore extends the end portion of the further fastener towards the tube to increase the clamping force, and rotating the further fastener in the other direction with respect to the further bore retracts the end portion of the further fastener away from the tube to decrease the clamping force.

8. The clamp of claim 1, wherein the second arm comprises:
an additional clamping surface to clamp another portion of optical fiber against the tube when the clamp is fastened around the tube, and
an additional clamping mechanism operable to extend at least part of the additional clamping surface towards the tube to increase a clamping force applied by the additional clamping surface.

9. The clamp of claim 8, wherein the additional clamping surface comprises a groove for receiving the other portion of optical fiber.

10. The clamp of claim 9, wherein the additional clamping mechanism comprises:
an additional bore formed in the at least one arm and terminating at the additional clamping surface, and
an additional fastener extending through the additional bore and having an end portion forming the at least part of the additional clamping surface which is operable to extend towards the tube to increase the clamping force applied by the additional clamping surface.

11. The clamp of claim 10, wherein an outer surface of the additional fastener and an inner surface of the additional bore comprise cooperating screw threads such that rotating the additional fastener in one direction with respect to the additional bore extends the end portion of the additional fastener towards the tube to increase the clamping force, and rotating the additional fastener in the other direction with respect to the additional bore retracts the end portion of the additional fastener away from the tube to decrease the clamping force.

12. The clamp of claim 8, wherein the first arm comprises a further clamping surface to clamp another portion of optical fiber against the tube when the clamp is fastened around the tube, and a further clamping mechanism operable to extend at least part of the further clamping surface towards the tube to increase a clamping force applied by the further clamping surface, wherein the clamping surface is equidistant from the further clamping surface and the additional clamping surface.

13. The clamp of claim 1, wherein the body portion further comprises a handle.

14. The clamp of claim 1, wherein the resilient portion comprises each of the first and second arms.

15. The clamp of claim 1, wherein the resilient portion comprises the body portion.

16. The clamp of claim 1, wherein each of the first and second arms is arcuate, and the first and second arms, with the body portion, define a curve of greater than 180 degrees.

17. The clamp of claim 16, wherein the first and second arms, with the body portion, define a curve of between 240 and 300 degrees.

18. The clamp of claim 16, wherein a diameter of the curve is 320 millimeters.

19. The clamp of claim 1, wherein the clamp is fabricated from an electrically insulating material.

20. The clamp of claim 1, wherein the groove is offset with respect to a longitudinal axis of the clamp.

21. A method of clamping optical fiber to a tube, the method comprising:
positioning a portion of optical fiber against the tube, the optical fiber comprising at least one pair of fiber Bragg gratings;
clamping the portion of optical fiber to the tube using a clamp, the clamp comprising a body portion coupled at one end to a first arm and at an opposing end to a second arm, the clamp having a resilient portion to permit the clamp to elastically deform from a closed state in which the clamp is fastened over the portion of optical fiber and around the tube to an open state in which the clamp is radially moveable off the tube, wherein application of a force separating the first and second arms biases the resilient portion and transitions the clamp from the closed state to the open state, and wherein the resilient portion returns the clamp from the open state to the closed state when the force is removed, at least one of the body portion, the first arm and the second arm having: a clamping surface to clamp a portion of the optical fiber against the tube when the clamp is fastened around the tube, wherein the clamping surface comprises a groove sized to receive within the groove the portion of the optical fiber; and a clamping mechanism comprising a bore and a fastener extending through the bore and having an end portion forming at least part of the clamping surface; and
operating the clamping mechanism to extend the fastener towards the tube and thereby extend the at least part of the clamping surface towards the tube to increase a clamping force applied by the clamping surface.

22. A clamp for clamping optical fiber to a magnetic tube, the clamp comprising a body portion coupled at one end to a first arm and at an opposing end to a second arm,
the clamp having a resilient portion to permit the clamp to elastically deform from a closed state in which the clamp is fastened around the tube to an open state in which the clamp is radially moveable off the tube, wherein application of a force separating the first and second arms biases the resilient portion and transitions the clamp from the closed state to the open state, and wherein the resilient portion returns the clamp from the open state to the closed state when the force is removed, at least one of the body portion, the first arm and the second arm having: a clamping surface to clamp a portion of the optical fiber against the tube when the clamp is fastened around the tube, wherein the clamping surface comprises a groove sized to receive within the groove the portion of the optical fiber; at least on magnet positioned so as to attract the clamping surface towards the tube; and a clamping mechanism comprising a bore and a fastener extending through the bore and having an end portion forming at least part of the clamping surface, the clamping mechanism being operable to extend the fastener towards the tube and thereby extend the at least part of the clamping surface towards the tube when the clamp is secured to the tube to increase a clamping force applied by the clamping surface.

23. The clamp of claim 22, wherein the at least one magnet is completely enclosed within the at least one of the body portion, the first arm and the second arm.

24. The clamp of claim 22, wherein the at least one magnet comprises an array of magnets.

25. The clamp of claim 22, wherein the at least one magnet comprises a rare earth magnet.

26. The clamp of claim 22, wherein each of the body portion, the first arm and the second arm comprises a separate clamping surface and a separate at least one magnet.

* * * * *